United States Patent [19]

Takeuchi et al.

[11] Patent Number: 5,114,437
[45] Date of Patent: May 19, 1992

[54] POLISHING COMPOSITION FOR METALLIC MATERIAL

[75] Inventors: Yoshiaki Takeuchi; Koji Yamamoto; Hiroshi Umezaki, all of Ehime, Japan

[73] Assignee: Sumitomo Chemical Co., Ltd., Osaka, Japan

[21] Appl. No.: 750,683

[22] Filed: Aug. 27, 1991

[30] Foreign Application Priority Data

Aug. 28, 1990 [JP] Japan ................. 2-227264

[51] Int. Cl.⁵ ................... C09K 3/14; C09G 1/02
[52] U.S. Cl. ....................... 51/293; 51/309; 106/3
[58] Field of Search .............. 106/3; 51/293, 309

[56] References Cited

U.S. PATENT DOCUMENTS

| | | |
|---|---|---|
| 4,529,410 | 7/1985 | Khaladji et al. ............ 51/309 |
| 4,601,755 | 7/1986 | Meélard et al. ............ 106/3 |
| 4,696,697 | 9/1987 | Kitano et al. ............ 106/3 |
| 4,769,046 | 9/1988 | Senda et al. ............ 106/3 |
| 4,915,710 | 4/1990 | Miyazaki et al. ............ 51/293 |
| 4,929,257 | 5/1990 | Miyazaki et al. ............ 51/293 |
| 4,935,039 | 6/1990 | Miyazaki et al. ............ 51/293 |

*Primary Examiner*—William R. Dixon, Jr.
*Assistant Examiner*—Helene Klemanski
*Attorney, Agent, or Firm*—Sughrue, Mion, Zinn, Macpeak & Seas

[57] ABSTRACT

A polishing composition for metallic materials, which comprises water, an alumina polishing agent, and a polishing accelerator, wherein the polishing accelerator is at least one selected from the group consisting of chromium(III) nitrate, lanthanum nitrate, ammonium cerium(III) nitrate, and neodymium nitrate. The polishing composition has a high polishing efficiency and provides a good surface smoothness.

7 Claims, No Drawings

POLISHING COMPOSITION FOR METALLIC MATERIAL

FIELD OF THE INVENTION

The present invention relates to a polishing composition for metallic materials. More specifically, the present invention relates to a polishing composition which is used for precise polishing of substrate materials for magnetic disks such as aluminum, a nickel-based alloy, etc., substrate materials for semiconductors such as silicon, gallium-arsenic, etc., and other metallic materials.

BACKGROUND OF THE INVENTION

With the development of electronics and computer industries, precise polishing of metallic materials such as substrate materials for magnetic disks, e.g., aluminum, a nickel-based alloy, etc., and substrate materials for semiconductors, e.g., silicon, gallium-arsenic, etc., has become a very important technique.

Recently, in magnetic disks and semiconductors, a recording density and an integration degree are increased, and in a precise polishing work of these substrate materials, the levels required for the surface smoothness and no defects (i.e., no scratches, orange peels, pits, nodules) on the polished surfaces have been more and more advancing. Accordingly, the improvement of the level of the precise polishing technique has become more important than ever.

Hitherto, a lapping work or a polishing work using free polishing agents (abrasives) has been practiced from old as a working method of obtaining a precision on a polished surface. Powders of alumina, silica, cerium oxide, zirconium oxide, iron oxide, chromium oxide, silicon carbide, diamond, etc., have been used as the polishing agents.

In these polishing agents, since alumina has a high hardness and an excellent polishing efficiency, and can be easily available, alumina has been widely utilized as polishing agents for metallic materials such as substrate materials for magnetic disks and semiconductors, etc.

From the view point of improving the surface smoothness and the removal rate on the polishing surface in the precise polishing work for substrate materials for magnetic disks and semiconductors, a specific polishing accelerator compound with water and an alumina polishing agent have been proposed.

For example, U.S. Pat. No. 4,696,697 discloses a neutral or weak acidic polishing composition for plastic articles and memory hard disks using nickel sulfate as a polishing accelerator, and U.S. Pat. Nos. 4,075,566 and 4,769,046 discloses a polishing composition for memory hard disks containing a polishing accelerator such as nickel nitrate and aluminum nitrate.

However, in the case of using nickel sulfate or nickel nitrate as a polishing accelerator, the pH is neutral or weakly acidic but the polishing composition has disadvantages that the polishing efficiency is insufficient and surface defects such as fine pits and nodules are liable to occur.

In the case of using aluminum nitrate as a polishing accelerator, the polishing composition shows a high polishing efficiency as compared with the case of using nickel sulfate or nickel nitrate but since the pH thereof is strongly acidic, of from 2 to 4, the polishing composition has disadvantages that the working property is poor and the polishing apparatus is corroded.

Furthermore, the surface smoothness of the polished surface can not attain the required level even by using the foregoing polishing accelerators, and hence a polishing composition having a high polishing efficiency and giving a polished surface having a good surface smoothness has been desired.

Under such circumstances, as the result of various investigations for obtaining a polishing composition for metallic materials having a high polishing efficiency and giving polished surfaces having less surface roughness and having no surface defects, the present inventors have discovered that when a specific polishing accelerator is used, a polishing composition for metallic materials satisfying all the requirements described above can be obtained and have succeeded in accomplishing the present invention.

SUMMARY OF THE INVENTION

An object of the present invention is to provide a polishing composition used for precise polishing of metallic materials, which has a high polishing efficiency and provides a good surface smoothness.

Other objects and effects of the present invention will be apparent from the following description.

The present invention provides a polishing composition for metallic materials, comprising water, an alumina polishing agent, and a polishing accelerator, wherein the polishing accelerator is at least one selected from the group consisting of chromium(III) nitrate, lanthanum nitrate, ammonium cerium(III) nitrate, and neodymium nitrate.

DETAILED DESCRIPTION OF THE INVENTION

In the present invention, as the polishing accelerator, at least one kind of compound selected from chromium(III) nitrate, lanthanum nitrate, ammonium cerium(III) nitrate, and neodymium nitrate is used. Among these, chromium(III) nitrate and lanthanum nitrate are preferably used. The term "(III)" after the metallic element shows the valence of the metallic element.

When chromium(III) nitrate is used as the polishing accelerator, a polishing composition having a pH of from 2 to 4 is obtained as similar to the case of using aluminum nitrate conventionally used as the polishing accelerator but is excellent in the removal rate and the surface smoothness as compared to the case of using aluminum nitrate.

In the case of using at least one compound selected from lanthanum nitrate, ammonium cerium(III) nitrate, and neodymium nitrate as the polishing accelerator, a polishing composition of weakly acidic or neutral pH of from 5 to 7 and excellent in the removal rate and the surface smoothness of the polished surface is obtained.

The content of the polishing accelerator in the polishing composition is generally from about 0.3 to about 10% by weight, and preferably from about 0.5 to about 5% by weight, based on the total amount of the polishing composition.

If the content of the polishing accelerator is less than about 0.3% by weight, the removal rate tends to be reduced and surface defects such as pits, nodules, etc., tend to occur. On the other hand, even if the content of the polishing accelerator is over about 10% by weight, a further improvement of the polishing acceleration is not obtained and inconveniences such as the increase of the burden for the waste water treatment, etc., tend to occur.

The alumina polishing agent for use in the present invention is generally α-alumina which is obtained by calcining aluminum hydrate such as boehmite, etc., for from 2 to 3 hours at a temperature of from 1,100° C. to 1,400° C. and grinding the calcined product using a dry or wet type vibration mill, ball mill, attritor, beads mill, etc., or a known fine pulverizer such as a high-speed rotary mill and a pneumatic pulverizer.

If necessary, by classifying off coarse particles by a means such as a wet gravity sedimentation means, a centrifugal sedimentation means, a dry type pneumatic classifier means, etc., the alumina polishing agent having desired particle sizes may be used.

The content of the alumina polishing agent in the polishing composition is generally from about 1 to about 30% by weight, and preferably from about 2 to about 25% by weight, based on the total amount of the polishing composition.

If the content of the alumina polishing agent is less than about 1% by weight, the polishing efficiency tends to be reduced and on the other hand, even if the content thereof is over about 30% by weight, a further improvement of the polishing efficiency is not obtained and an inconvenience that the viscosity is increased to reduce the workability tends to occur.

The average particle size of the alumina polishing agent is generally from about 0.2 to about 5 μm, and preferably from about 0.3 to about 3 μm.

If the average particle size thereof is less than about 0.2 μm, the polishing efficiency tends to be reduced and the fine particles tend to be agglomerated to be liable to cause defects such as orange peels, etc., while the average particle size is over about 5 μm, the surface smoothness of the polished surface becomes worse.

A process for preparing the polishing composition of the present invention is not particularly limited, and the components, i.e., water, alumina polishing agent and polishing accelerator, are mixed to produce the polishing composition. The method and order of mixing are not limited.

The polishing composition of the present invention can contain, if necessary, cellulose compounds such as cellulose, carboxymethyl cellulose, hydroxyethyl cellulose, etc., and water-soluble polymers such as polyvinyl alcohol, etc., as a precipitation inhibitor, and surface active agents such as fatty acid esters, Turkey red oil, etc., as a lubricant.

The function and mechanism of the polishing accelerator in the present invention have not yet been clarified but it is considered that the mechanochemical polishing action to a polishing surface and the action to control the dispersing and agglomerating states of the alumina polishing agent in the polishing composition advantageously functions to the precise polishing work of metallic materials.

The polishing composition of the present invention is used for precise polishing of any metallic materials but is particularly suitable for precise polishing of a substrate material for magnetic disks plated with a nickel-based alloy.

The polishing composition of the present invention described above can be used in the same manner as in the case of conventional polishing compositions. That is, only the polishing composition of the present invention is applied between a material to be polished and a polishing pad sliding on the surface thereof. As a result, the polishing composition of the present invention can carry out a precise polishing work of metallic materials such as substrate materials for magnetic disk, semiconductors, etc., with a high polishing efficiency, with less surface roughness, and with less surface defects. Therefore, the industrial value thereof is very large.

Then, the present invention is further described in more detail by referring to the following examples but the present invention is not construed as being limited to them.

The measurements and observations in the examples were performed by the following methods.

Average Particle Size:

The measurement of the average particle size was carried out by a light scattering particle size distribution analyzer, Macrotrack SPA.

Surface Roughness:

The surface roughness was measured by Surfcoder ET-30HK (manufactured by Kosaka Laboratory Ltd.) using 0.5 μm R stylus, and at a measurement length of 0.8 mm and a cut off value of 80 μm.

Surface Observation

The presence of surface defects such as microscratches, pits, nodules, etc., on the polished surface was observed by a differential interference microscope (magnifications: 50 and 400).

Removal Rate

The weights of a material to be polished before and after polishing were measured and the polished thickness was calculated from the specific gravity of the material.

EXAMPLE 1

As a material to be polished, an aluminum substrate for magnetic disk having been subjected to non-electrolysis Ni-P plating (outer diameter 3.5 inches, the thickness of the Ni-P plated layer 17 μm, the surface roughness before polishing Ra: 0.02 μm, Rmax: 0.30 μm) was used and both the surfaces of the substrate were polished using a 4 way type double sided polishing machine (plate diameter 640 mm).

As a polishing pad, a suede type pad ("Domitex 25-6", manufactured by Daiichi Lace K. K.) was used and polishing was carried out under the conditions of a lower plate rotation number of 40 r.p.m. and a working pressure of 125 g/cm$^2$.

A polishing composition was formed as a slurry by adding 8.6% by weight of alumina polishing agent having an average particle size of 0.6 μm and 0.8% by weight of chromium(III) nitrate ($Cr(NO_3)_3.9H_2O$) as a polishing accelerator to pure water. While supplying the polishing composition in a slurry form between the disk and the polishing pad at a rate of 40 ml/min., polishing was carried out for 5 minutes. After polishing, the removal rate and the surface roughness of the polished surface were measured and the polished surface was observed.

The results are shown in Table 1 below.

EXAMPLES 2 TO 5 AND COMPARATIVE EXAMPLES 1 TO 3

By following the same procedure as Example 1 except that each polishing accelerator shown below was used in place of the polishing accelerator for the polishing composition used in Example 1, each aluminum substrate for magnetic disk having been subjected to non-electrolysis Ni-P plating was polished.

The kind and the addition amount (weight percent) of each polishing accelerator used in each example or comparative example are shown below.

| | | |
|---|---|---|
| Example 2: | $La(NO_3)_3 \cdot 6H_2O$ | 0.8% by weight |
| Example 3: | $La(NO_3)_3 \cdot 6H_2O$ | 1.5 by weight |
| Example 4: | $Ce(NO_3)_3 \cdot 2(NH_4NO_3) \cdot 4H_2O$ | 0.8 by weight |
| Example 5: | $Nd(NO_3)_3 \cdot 6H_2O$ | 0.8 by weight |
| Comparative Example 1: | $Al(NO_3)_3 \cdot 9H_2O$ | 0.8 by weight |
| Comparative Example 2: | $NiSO_4 \cdot 6H_2O$ | 0.8 by weight |
| Comparative Example 3: | none | |

The results are shown in Table 1 below.

TABLE 1

| | pH of composition | Removal rate (μm/min) | Surface roughness Ra (Å) | Surface roughness Rmax (Å) | Surface observation |
|---|---|---|---|---|---|
| Example 1 | 3.4 | 0.49 | 21 | 250 | good |
| Example 2 | 6.2 | 0.48 | 22 | 290 | good |
| Example 3 | 6.1 | 0.48 | 22 | 280 | good |
| Example 4 | 5.8 | 0.49 | 23 | 300 | good |
| Example 5 | 5.6 | 0.55 | 26 | 310 | good |
| Comparative Example 1 | 3.8 | 0.45 | 25 | 300 | good |
| Comparative Example 2 | 5.4 | 0.27 | 23 | 310 | micro pits and nodules observed |
| Comparative Example 3 | 9.5 | 0.25 | — | — | nodules observed |

It can be understood from the results shown in Table 1 above that the polishing compositions according to the present invention have a high polishing efficiency and provide a good surface smoothness.

While the invention has been described in detail and with reference to specific examples thereof, it will be apparent to one skilled in the art that various changes and modifications can be made therein without departing from the spirit and scope thereof.

What is claimed is:

1. A polishing composition for metallic materials, said composition comprising water, an alumina polishing agent, and a polishing accelerator, wherein said polishing accelerator is at least one selected from the group consisting of chromium(III) nitrate, lanthanum nitrate, ammonium cerium(III) nitrate, and neodymium nitrate.

2. A polishing composition as claimed in claim 1, wherein the content of said polishing accelerator is from about 0.3 to about 10% by weight.

3. A polishing composition as claimed in claim 2, wherein the content of said polishing accelerator is from about 0.5 to about 5% by weight.

4. A polishing composition as claimed in claim 1, wherein the content of said alumina polishing agent is from about 1 to about 30% by weight.

5. A polishing composition as claimed in claim 4, wherein the content of said alumina polishing agent is from about 2 to about 25% by weight.

6. A polishing composition as claimed in claim 1, wherein the average particle size of said alumina polishing agent is from about 0.2 to about 5 μm.

7. A polishing composition as claimed in claim 6, wherein the average particle size of said alumina polishing agent is from about 0.3 to about 3 μm.

* * * * *